(12) United States Patent
Capella

(10) Patent No.: US 6,469,249 B2
(45) Date of Patent: Oct. 22, 2002

(54) HINGE COVER FOR ELECTRICAL DEVICES, AND ELECTRICAL DEVICE PROVIDED THEREWITH

(75) Inventor: Joaquin Aubert Capella, Barcelona (ES)

(73) Assignee: Simon, S.A., Barcelona (ES)

( * ) Notice: Subject to any disclaimer, the term of this patent is extended or adjusted under 35 U.S.C. 154(b) by 0 days.

(21) Appl. No.: 09/903,080

(22) Filed: Jul. 11, 2001

(65) Prior Publication Data

US 2002/0014347 A1 Feb. 7, 2002

(30) Foreign Application Priority Data

Jul. 11, 2000 (ES) ................................................ 0001858

(51) Int. Cl.⁷ .................................................. H02G 3/14
(52) U.S. Cl. ........................... 174/66; 174/67; 220/241; 220/242
(58) Field of Search .............................. 174/66, 67, 53; 220/241, 242; 439/135, 107

(56) References Cited

U.S. PATENT DOCUMENTS

| | | | | | |
|---|---|---|---|---|---|
| 1,966,542 A | * | 7/1934 | Despard | ....................... | 174/53 |
| 3,956,573 A | * | 5/1976 | Myers et al. | ................. | 174/48 |
| 4,271,337 A | * | 6/1981 | Barkas | ..................... | 200/51.09 |
| 4,424,407 A | * | 1/1984 | Barbic | .......................... | 174/67 |
| 4,545,631 A | * | 10/1985 | Zampmi | .................. | 339/14 R |
| 5,280,135 A | * | 1/1994 | Berlin et al. | .................. | 174/67 |
| 5,573,412 A | * | 11/1996 | Anthony | ..................... | 439/133 |
| 5,747,739 A | * | 5/1998 | Moeller | ....................... | 174/67 |

* cited by examiner

Primary Examiner—Dean A. Reichard
Assistant Examiner—Dhiru R Patel
(74) Attorney, Agent, or Firm—Michael J. Striker

(57) ABSTRACT

A cover for electrical devices has a cover element rotatable about a rotation axis; elements provided in two areas at a distance to each other defining the rotation axis, the elements being adapted to be integral with a frame of a body of the device and the cover element, so as to allow the cover element to take two limit positions including a position in which the cover element is folded against the frame and a position in which it is perpendicular to the frame.

10 Claims, 3 Drawing Sheets

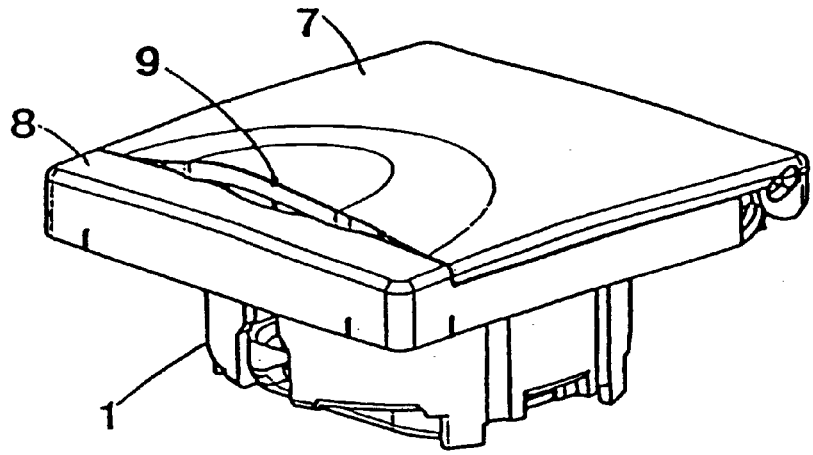
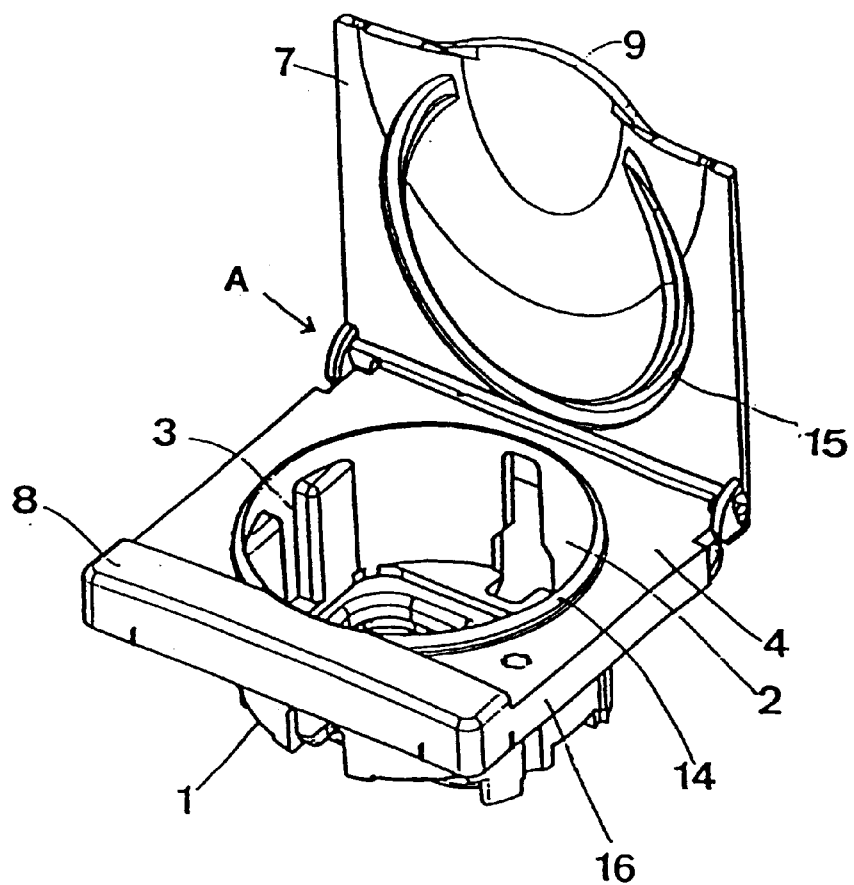

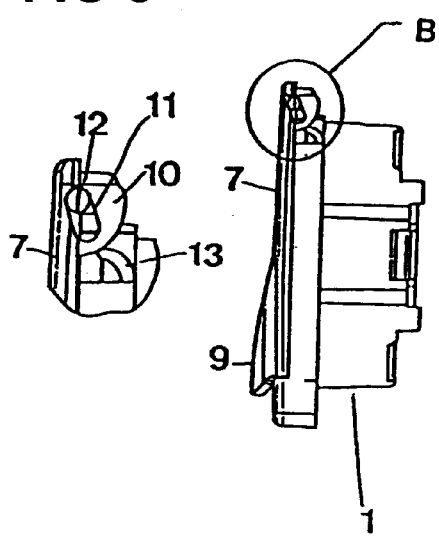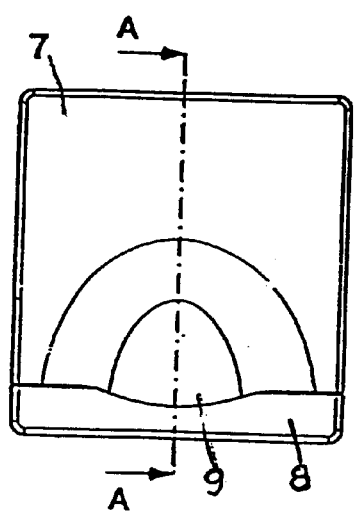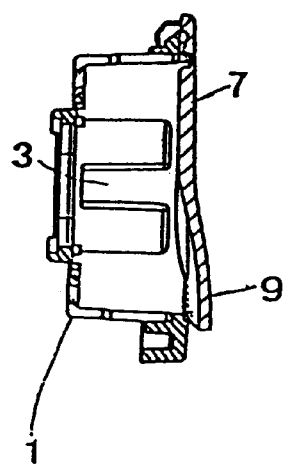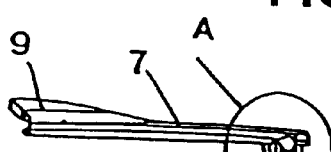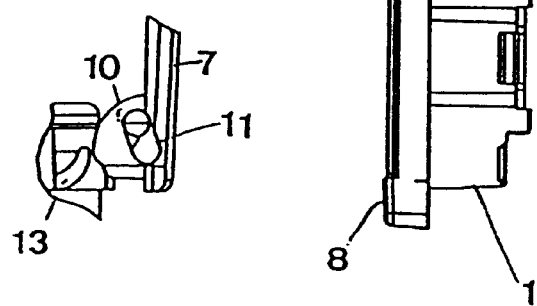

HINGE COVER FOR ELECTRICAL DEVICES, AND ELECTRICAL DEVICE PROVIDED THEREWITH

BACKGROUND OF THE INVENTION

The present invention relates to a hinge cover for electrical devices as well as to an electrical device provided therewith.

The invention, in particular, deals with a mechanism for moving a part protecting a device, such as a wall mounting plate for a switch or another electrical device, with a cover for preventing in certain cases the access to the corresponding parts.

Electrical devices are known such as wall mounting plates for switches, provided with tilting hinged covers which prevent that the children have access to the metallic parts in contact with the current or that dust, moisture or other products of the environment enter the switches. The hinging mechanism of the existing covers are relatively complex and generally they only allow the angular movement, counting on a spring for moving to a closing position when the electrical device is not in use. Usually it is not possible to provide a cover with an intermediate angular position between an opening position and a total closing or a continued total opening position.

SUMMARY OF THE INVENTION

Accordingly, it is an object of the present invention to provide a hinge cover for electrical devices, and electrical device provided therewith, which avoid the disadvantages of the prior art.

More particularly, it is an object of present invention to provide a hinge cover for electrical devices, and an electrical device provided therewith, which make possible different orientations of the cover during the time the device is being used, without compromising on the performance of the device as a whole.

In keeping with these objects and with others which will become apparent hereinafter, one feature of present invention resides, briefly stated, in a cover for electrical devices, comprising a cover element rotatable about a rotation axis; elements provided in two areas at a distance to each other defining said rotation axis, said elements being adapted to be integral with a frame of a body of the device and said cover element, so as to allow said cover element to take two limit positions including a position in which said cover element is folded against the frame and a position in which it is perpendicular to the frame.

It is also an object of the present invention to provide an electrical device which has a cover element rotatable about a rotation axis; elements provided in two areas at a distance to each other defining said rotation axis, said elements being adapted to be integral with a frame of a body of the device and said cover element, so as to allow said cover element to take two limit positions including a position in which said cover element is folded against the frame and a position in which it is perpendicular to the frame.

When the hinge cover and the device are designed in accordance with the present invention, they eliminate the disadvantages of the prior art and provide for the highly advantageous results.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of an electrical device such as wall switch mounting plate, with a cover in a closing position and with a frame;

FIG. 2 is a view showing the electrical device in perspective with the cover forming a 90° angle with respect to the prior position of Figure

FIG. 7 is a side view of the device with its cover folded;

FIG. 8 is an enlarged detail of the hinge of the inventive device;

FIG. 9 is a front view of the hinge of the inventive device;

FIG. 10 is a view showing a section taken along the line A—A; and

FIGS. 11 and 12 are views corresponding to the views of FIGS. 7 and 8, with the cover forming a 90° angle with respect to the closing position.

DESCRIPTION OF THE PREFERRED EMBODIMENTS

Figure 3:
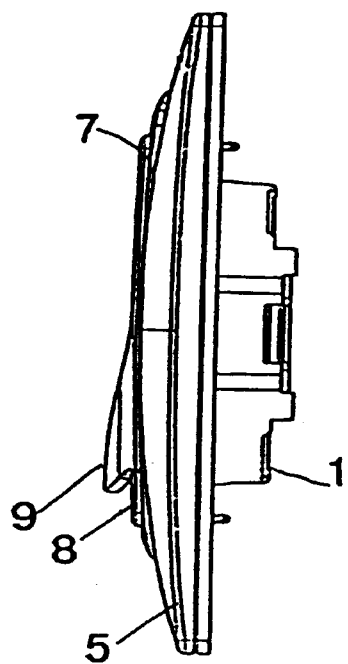
FIGS. 3 and 4 are a side view and a cross-section of the device with its cover applied to it.
Figure 4:
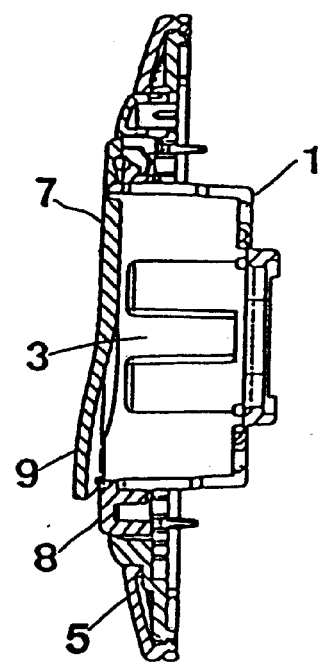
Figure 5:
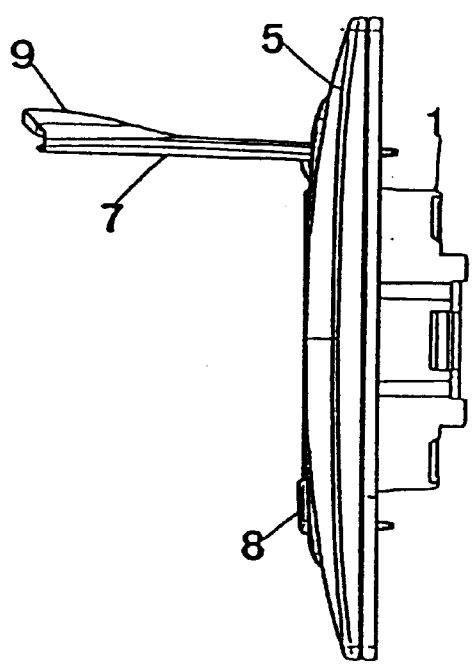
FIGS. 5 and 6 are views corresponding to the views of FIGS. 3 and 4, with the cover forming a 90° angle with the closing position.
Figure 6:
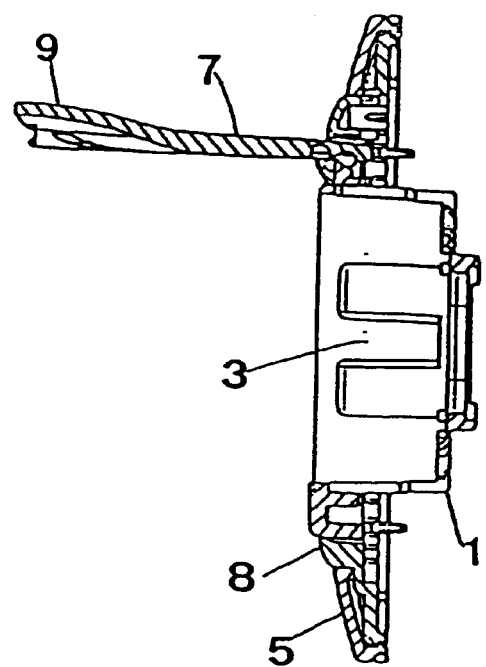

An electrical device, such as in the shown example a wall mounting plate for a switch, has a body 1 provided with a cylindrical recess 2 for receiving a two or three-pin plug, with or without a ground connection, which is fit to recesses 3 defined in a housing. A quadrangular or similar frame 4 is integral with the body 1 at its mouthpiece and forms a mounting plate for the device, which is optionally completed with a surrounding embellishing plate or frame 5 as shown in FIGS. 3–6.

A cover 7 further has a shape and sizes similar to those of the frame 4. Of course, it can be of a smaller size, corresponding to the width of a narrow rectangular area close to one of the sides of the frame 4.

The cover 7 has a curved and warped flange 9. The flange 9 facilitates the cover operation with one or two fingers of one hand.

As can be seen from FIGS. 8 and 12, the covers 7 close to two vertices of a same side, has quadrant-shaped wings 10 which are provided with sliding openings 11. The frame 4 also includes, close to two of its vertices, cylindrical stops 12. In addition, close to the stops 12 the frame 4 also has curved protrusions 13, with which the wings 10 come into contact with the possibility to slide.

Two limit positions of the cover 7 are defined with respect to the frame 4.

In the situation shown in FIGS. 1, 7, 8 the thrusting force from the parts 10 and 13 friction gives rise to the displacement of the wings 10 until they surround the stops 12 at each side at an end of the sliding openings 11 and the cover 7 remains applied to the mouthpiece of the recess 2, so as to close the device by the cover and to conceal its interior.

In the situation shown in FIGS. 2, 11 and 12, the lack of friction from the wings 10 and the protrusions 13 allows that the other end of the opening 11 of each side is the one which surrounds the respective stop 12, and the cover remains at the right angle position illustrated. This provides opening of the device and free access inside it.

By the dimensioning the width of the sliding openings 11 and the diameter of the stops 12 so that they are always exist a slide friction, a stable position of the cover 7 can be achieved in any intermediate orientation between the above mentioned two positions.

Closing of the body 1 with the cover 7 is completed with a rim or rib 14 at the mouthpiece of the recess 2, to which a circular recess 15 on the internal face of the cover 7 corresponds. This way, a practically tight closing of the device body 1 is achieved.

The cover 7 advantageously can be composed of a transparent or translucent material, so as to allow seeing at least in part the interior of the protected electrical device. When the device includes a light indicator, such as for example a luminescent diode 16, its light will be seen through the cover when the cover is applied against the frame 4.

It will be understood that each of the elements described above, or two or more together, may also find a useful application in other types of constructions differing from the types described above.

While the invention has been illustrated and described as embodied in hinge cover for electrical devices, and electrical device provided therewith, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A cover for an electrical device, comprising a cover element rotatable about a rotation axis; elements provided in two areas at a distance to each other defining said rotation axis, said elements being adapted to be integral with a frame of a body of the device and said cover element, so as to allow said cover element to take two limit positions including a first position in which said cover element is folded against the frame and a second position in which it is perpendicular to the frame, wherein said elements include a pair of cylindrical stops which are coaxial with one another, and at each side, an articulated rib having a rounded end.

2. A cover as defined in claim 1, and further comprising a peripheral rim adapted to be provided on the frame of the body, said cover having an annular recess on an internal face cooperating with said peripheral rim.

3. A cover as defined in claim 1, wherein said cover element is composed of a translucent material allowing a viewer to see the device and light indicators in the device.

4. A cover as defined in claim 1, and further comprising an embellishing frame in which the device is housable with pressure and setting.

5. An electrical device, comprising a cover element rotatable about a rotation axis; elements provided in two areas at a distance to each other defining said rotation axis, said elements being adapted to be integral with a frame of a body of the device and said cover element so as to allow said cover element to take two limit positions including a first position in which said cover element is folded against the frame and a second position in which it is perpendicular to the frame, wherein said elements include a pair of cylindrical stops which are coaxial with one another, and at each side, an articulated rib having a rounded end.

6. A cover as defined in claim 5, and further comprising a peripheral rim adapted to be provided on the frame of the body, said cover having an annular recess on an internal face cooperating with said peripheral rim.

7. A device as defined in claim 5, wherein said cover element is composed of a translucent material allowing to see the device and eventual light signaling elements.

8. A device as defined in claim 5, and further comprising an embellishing frame in which the device is housable with pressure and setting.

9. A cover for an electrical device, comprising a cover element rotatable about a rotation axis; elements provided in two areas at a distance to each other defining said rotation axis, said elements being adapted to be integral with a frame of a body of the device and said cover element, so as to allow said cover element to take two limit positions including a first position in which said cover element is folded against the frame and a second position in which it is perpendicular to the frame, wherein said elements include a pair of triangular wings provided with sliding openings for housing stops of the frame and with a curved side which tangentially contacts a curved rib of the frame, so as to define two limit positions of said cover element with respect to said frame with correspondingly 0 to 90° angles and a plurality of intermediate positions between said elements.

10. An electrical device, comprising a cover element rotatable about a rotation axis; elements provided in two areas at a distance to each other defining said rotation axis, said elements being adapted to be integral with a frame of a body of the device and said cover element, so as to allow said cover element to take two limit positions including a first position in which said cover element Is folded against the frame and a second position in which it is perpendicular to the frame, wherein said elements include a pair of triangular wings with sliding openings for housing stops of the frame and with a curved side which tangentially contacts a curved rib of the frame, so as to define two limit positions of said cover element with respect to said frame with correspondingly 0 to 90° angles and a plurality of intermediate positions between said elements.

* * * * *